US010563477B2

(12) United States Patent
Patil et al.

(10) Patent No.: US 10,563,477 B2
(45) Date of Patent: Feb. 18, 2020

(54) CHEMICAL MEANS TO PREDICT END OF JOB IN REVERSE-CIRCULATION CEMENTING

(71) Applicant: HALLIBURTON ENERGY SERVICES, INC., Houston, TX (US)

(72) Inventors: Sandip Prabhakar Patil, Pune (IN); Siva Rama Krishna Jandhyala, Pune (IN); Shreya Mohan, Pune (IN); Rahul Chandrakant Patil, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 154 days.

(21) Appl. No.: 15/760,886

(22) PCT Filed: Dec. 23, 2015

(86) PCT No.: PCT/US2015/000248
§ 371 (c)(1),
(2) Date: Mar. 16, 2018

(87) PCT Pub. No.: WO2017/111777
PCT Pub. Date: Jun. 29, 2017

(65) Prior Publication Data
US 2018/0274327 A1     Sep. 27, 2018

(51) Int. Cl.
*E21B 33/14* (2006.01)
*C09K 8/42* (2006.01)
(Continued)

(52) U.S. Cl.
CPC .......... *E21B 33/14* (2013.01); *C04B 24/383* (2013.01); *C04B 28/02* (2013.01); *C09K 8/424* (2013.01);
(Continued)

(58) Field of Classification Search
CPC .......... E21B 33/13; E21B 33/14; C09K 8/42; C09K 8/428; C09K 8/44
See application file for complete search history.

(56) References Cited

U.S. PATENT DOCUMENTS 4,724,906 A * 2/1988 Sydansk .................. C09K 8/44
166/294
5,494,107 A * 2/1996 Bode ....................... E21B 21/10
166/242.8
(Continued)

FOREIGN PATENT DOCUMENTS

WO     WO 2015019112 A2    2/2015

OTHER PUBLICATIONS

International Search Report and Written Opinion for International Application No. PCT/US2015/000248 dated Sep. 21, 2016. (12 pages).

*Primary Examiner* — Kenneth L Thompson
(74) *Attorney, Agent, or Firm* — Haynes and Boone, LLP (57) ABSTRACT

Methods and systems for cementing casing in a wellbore are described. The methods include introducing a modified biopolymer into an inner diameter of the casing, reverse-circulating a cement composition in the wellbore, permitting the modified biopolymer to contact the cement composition, and terminating the reverse-circulation upon detection of an increase in pressure in pumping the cement composition. The modified biopolymer includes a reaction product of a biopolymer and an organic carbonate, and the cement composition has a pH greater than 11.

20 Claims, 5 Drawing Sheets

(51) Int. Cl.
    *C04B 28/02*    (2006.01)
    *C09K 8/467*    (2006.01)
    *E21B 33/13*    (2006.01)
    *E21B 33/16*    (2006.01)
    *C04B 24/38*    (2006.01)
    *E21B 47/06*    (2012.01)

(52) U.S. Cl.
    CPC .............. *C09K 8/467* (2013.01); *E21B 33/13* (2013.01); *E21B 33/16* (2013.01); *E21B 47/06* (2013.01)

(56) References Cited

U.S. PATENT DOCUMENTS

| | | | |
|---|---|---|---|
| 6,152,227 A * | 11/2000 | Lawson | C04B 28/24 |
| | | | 166/293 |
| 7,322,412 B2 | 1/2008 | Badalamenti et al. | |
| 9,249,646 B2 * | 2/2016 | Hannegan | E21B 33/16 |
| 9,809,738 B2 * | 11/2017 | Luke | C09K 8/467 |
| 2006/0042798 A1 * | 3/2006 | Badalamenti | E21B 21/10 |
| | | | 166/285 |
| 2009/0020285 A1 | 1/2009 | Chase et al. | |
| 2011/0094742 A1 | 4/2011 | Badalamenti et al. | |
| 2012/0090841 A1 | 4/2012 | Reddy et al. | |
| 2012/0138299 A1 * | 6/2012 | Joseph | C04B 28/06 |
| | | | 166/293 |
| 2012/0305250 A1 | 12/2012 | Burts, Jr. et al. | |

* cited by examiner

CHEMICAL MEANS TO PREDICT END OF JOB IN REVERSE-CIRCULATION CEMENTING

CROSS-REFERENCE TO RELATED APPLICATION

The present application is a U.S. National Stage patent application of International Patent Application No. PCT/US2015/000248, filed on Dec. 23, 2015, the benefit of which is claimed and the disclosure of which is incorporated herein by reference in its entirety.

BACKGROUND

The present invention relates generally to cementing casing in subterranean formations. In particular, the present invention relates to methods of cementing a casing annulus by reverse-circulating a cement composition that contacts a modified biopolymer.

It is common in the oil and gas industry to cement casing in wellbores. Generally, a wellbore is drilled and a casing string is inserted into the wellbore. Drilling mud and/or a circulation fluid is circulated through the annulus and the casing inner diameter to flush excess debris from the well. Cement composition is then pumped into the annulus between the casing and the wellbore.

Two pumping methods have been used to place the cement composition in the annulus. In the first method, the cement composition slurry is pumped down the casing inner diameter, out through a casing shoe and/or circulation valve at the bottom of the casing and up through the annulus to its desired location. This is called a conventional-circulation direction. In the second method, the cement composition slurry is pumped directly down the annulus so as to displace well fluids present in the annulus by pushing them through the casing shoe and up into the casing inner diameter. This is called a reverse-circulation direction.

In reverse-circulation cementing, the leading edge of the cement slurry must be monitored to determine when it arrives at the casing shoe. Logging tools and tagged fluids (by density and/or radioactive sources) have been used to monitor the position of the leading edge of the cement slurry. If significant volumes of the cement slurry enter the casing shoe, clean-out operations must be conducted to insure that cement inside the casing has not covered targeted production zones. Position information provided by tagged fluids is typically available to the operator only after a considerable delay. Thus, even with tagged fluids, the operator is unable to stop the flow of the cement slurry into the casing through the casing shoe until a significant volume of cement has entered the casing. Imprecise monitoring of the position of the leading edge of the cement slurry can result in a column of cement in the casing 100 feet to 500 feet long. This unwanted cement must then be drilled out of the casing at a significant cost. The drill out procedure may be avoided by preventing the cement composition from entering the inner diameter of the casing through the casing shoe and/or circulation valve.

Thus, there is a continuing need for improved methods and compositions for indicating an end of job when performing a reverse cementing operation.

BRIEF DESCRIPTION OF THE DRAWINGS

The following figures are included to illustrate certain aspects of the present invention, and should not be viewed as an exclusive embodiment. The subject matter disclosed is capable of considerable modification, alteration, and equivalents in form and function, as will occur to those skilled in the art and having the benefit of this disclosure.

DETAILED DESCRIPTION

Figure 1:
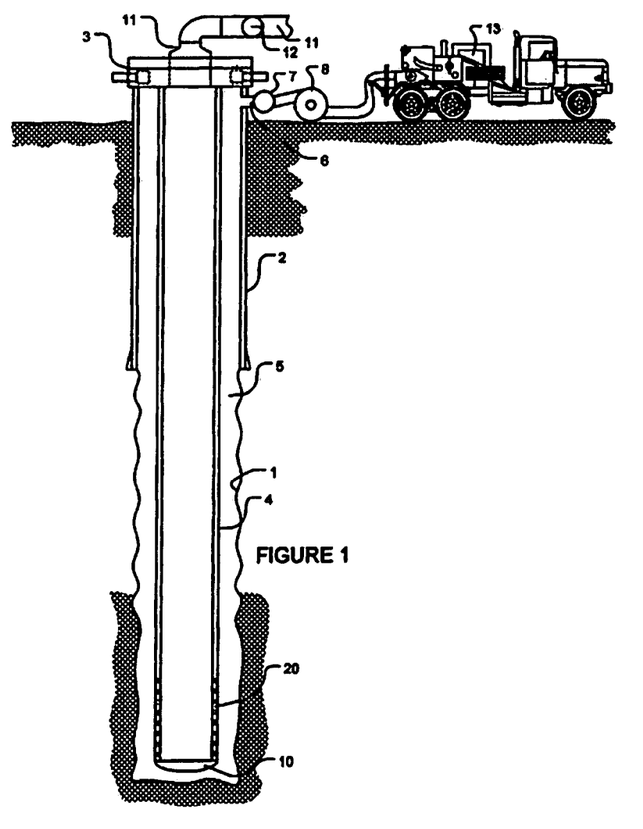
FIG. 1 is a cross-sectional side view of a wellbore with a casing having a casing shoe and a circulation valve.

Referring to FIG. 1, a cross-sectional side view of a wellbore is illustrated. In particular, surface casing 2 is installed in the wellbore 1. A well head 3 is attached to the top of the surface casing 2 and casing 4 is suspended from the well head 2 and the wellbore 1. An annulus 5 is defined between the wellbore 1 and the casing 4. A casing shoe 10 is attached to the bottom most portion of the casing 4. A feed line 6 is connected to the surface casing 2 to fluidly communicate with the annulus 5. The feed line 6 has a feed valve 7 and a feed pump 8. The feed line 6 may be connected to a cement pump truck 13. The feed line 6 may also be connected to a vacuum truck, a stand alone pump or any other pumping mechanism known to persons of ordinary skill in the art for pumping fluids. A return line 11 is connected to the well head 3 so as to fluidly communicate with the inner diameter of the casing 4. The return line has a return valve 12. The casing 4 also includes a circulation valve 20 near the casing shoe 10. When the circulation valve 20 is open, circulation fluid may flow between the annulus 5 and the inner diameter of the casing 4 through the valve.

According to several exemplary embodiments, methods are provided for cementing casing in a wellbore without permitting excessive flow of cement composition into the inner diameter of the casing 4. The methods use one or more modified biopolymers as a chemical means to indicate the end of a job (e.g., when the leading edge of the cement slurry reaches the casing shoe 10) in reverse-circulation cementing. The modified biopolymer is placed in the inner diameter of the casing 4, and contacts the cement slurry as the slurry is pumped down the annulus 5 and up into the casing 4 inner diameter. As used herein, the word "pumping" broadly means to flow the cement slurry into the annulus 5. The modified biopolymer does not dissolve in mud or spacer fluid, but will only dissolve in the cement slurry. As the modified biopolymer contacts the cement slurry, it gels and/or increases the viscosity of the cement slurry. This sudden increase in viscosity results in increased pressure of pumping the cement slurry, which indicates that the cement has reached the bottom of the annulus 5. Suitable modified biopolymers are described in U.S. Pat. No. 8,720,562, the entire disclosure of which is incorporated herein by reference.

The modified biopolymer is a reaction product of a polymer and an organic carbonate. According to several exemplary embodiments, the polymer is a biopolymer that includes a polysaccharide that may be represented by the formula $C_x(H_2O)_y$, where x and y are greater than 0. As used herein, a "biopolymer" refers to a polymer that is generated from renewable natural sources and is often biodegradable. Biopolymers suitable for use in this disclosure may be produced by biological systems (i.e., micro-organisms, plants and animals), or obtained by chemical derivatization of such biological starting materials (e.g. hydroxyethylated, hydroxypropylated, carboxymethylated and/or carboxymethylated hydroxyethylated derivatives of such biopolymers). Non-limiting examples of biopolymers suitable for use in this disclosure include gums, starches, celluloses, derivatized polysaccharides such as hydroxyethyl cellulose (HEC), carboxymethyl cellulose, and carboxymethylhydroxyethyl cellulose, or combinations thereof.

According to several exemplary embodiments, the biopolymer includes a gum. As used herein, a "gum" refers to polysaccharides that are exuded by certain plants and trees, stored by plants as seed endosperm, produced by bacteria as exocellular materials, and/or dried into water-soluble, non-crystalline, brittle solids. Gums may be further characterized by their ability to increase the viscosity of a solution. In general, viscosity may be considered a measure of the resistance of a fluid which is being deformed by shear stress. In other words, it is the resistance of a liquid to flow. Gums having the characteristics disclosed herein that are obtained from man-made sources (e.g., synthetic) are also contemplated as being suitable for use in this disclosure. Non-limiting examples of gums suitable for use in this disclosure include without limitation agar, alginic acid, beta-glucan, carrageenan, chicle gum, dammar gum, gellan gum, guar gum, gum arabic, gum ghatti, gum tragachanth, karava gum, locust bean gum, mastic gum, *psyllium* seed husks, sodium alginate, spruce gum, tara gum, xanthan gum, or combinations thereof. Non-limiting examples of gum derivatives suitable for use in this disclosure include hydroxypropyl guar, and carboxymethyl hydroxypropyl guar. Non-limiting examples of bacterial gums suitable for use in this disclosure include diutan and xanthan.

According to several exemplary embodiments, the biopolymer includes cellulose and/or its chemically derivatized water soluble derivatives. "Cellulose" herein refers to a polysaccharide consisting of a linear chain of $\beta(1\to4)$ linked D-glucose units. Non-limiting examples of water-soluble cellulose derivatives suitable for use in this disclosure include hydroxyethyl cellulose (HEC), hydroxypropyl cellulose, carboxymethyl cellulose, and carboxymethylhydroxyethyl cellulose. Non-limiting examples of commercially available biopolymers suitable for use in this disclosure include CELLOSIZE™ brand products from Dow Chemical Company, NATRASOL™ brand products from Hercules Corporation and TYLOSE® brand products from Clariant Corporation, Mount Holly, N.C.

According to several exemplary embodiments, a reaction mixture for preparation of the modified biopolymer includes an organic carbonate. Generally, the organic carbonate includes at least one carbonate group represented by the formula $(O=C(O-C)_2)$. In various embodiments, the organic carbonate has multiple carbonate groups. In some embodiments, a reaction mixture for the preparation of a modified biopolymer includes more than one type of organic carbonate.

According to several exemplary embodiments, a method of preparing a modified biopolymer of the type described herein includes contacting a biopolymer of the type described herein (e.g., HEC) and an organic carbonate (e.g., ethylene carbonate) to form a reaction mixture. The reaction mixture may contain a weight ratio of biopolymer to organic carbonate in the range of from about 1:0.01 to about 1:0.5; alternatively from about 1:0.08 to about 1:0.20; alternatively from about 1:0.1 to about 1:0.15 to form a reaction mixture.

According to several exemplary embodiments, the biopolymer includes HEC and the carbonate includes ethylene carbonate. The HEC is mixed with the ethylene carbonate at a ratio of 9:1 at about 80° C. for 6 to 8 hours to form the modified biopolymer.

After modification, the modified biopolymer is insoluble at: (1) lower pHs and lower temperatures, (2) very high pHs and lower temperatures, and (3) lower pHs and higher temperatures. The modified biopolymer is only soluble at higher pHs and higher temperatures, where the pH is greater than 11 and the temperature is greater than 100° F. Mud and spacer fluid typically have a pH of about 7-10, while cement slurries tend to have a pH greater than 12. This behavior ensures that the modified biopolymer only dissolves and thickens when it contacts the cement slurry.

Advantageously, the temperature for activating the modified biopolymer is relatively low, and because the reaction occurs even at high temperatures, the methods can be applied across a wide temperature range. Moreover, there are no moving parts or mechanical activation mechanisms, so the methods are reliable. The mechanism for determining the end of job is operationally very simple and cost-effective.

The modified biopolymer can then be used for the indication of cement reaching a casing shoe when reverse-circulation cementing is performed. As the cement slurry travels down the annulus and up into the casing inner diameter, the slurry contacts the modified biopolymer. The modified biopolymer dissolves in the slurry, causing an increase in viscosity of the slurry. According to several exemplary embodiments, to effect an increase in the viscosity of the slurry, the modified biopolymer is present in the cement slurry in an amount of about 0.5% to about 10% by weight of the cement slurry. This sudden increase in viscosity is reflected by the increased pressure required to pump the cement slurry and indicates that that the cement slurry has reached the bottom of the annulus or the casing shoe.

According to several exemplary embodiments, the methods for cementing casing in a wellbore include introducing a modified biopolymer into an inner diameter of the casing, wherein the modified biopolymer includes a reaction product of a biopolymer and an organic carbonate, reverse-circulating a cement composition in the wellbore, wherein the cement composition has a pH greater than 11, permitting the modified biopolymer to contact the cement composition, and terminating the reverse-circulation upon detection of an increase in pressure in pumping the cement composition.

Figure 2A:
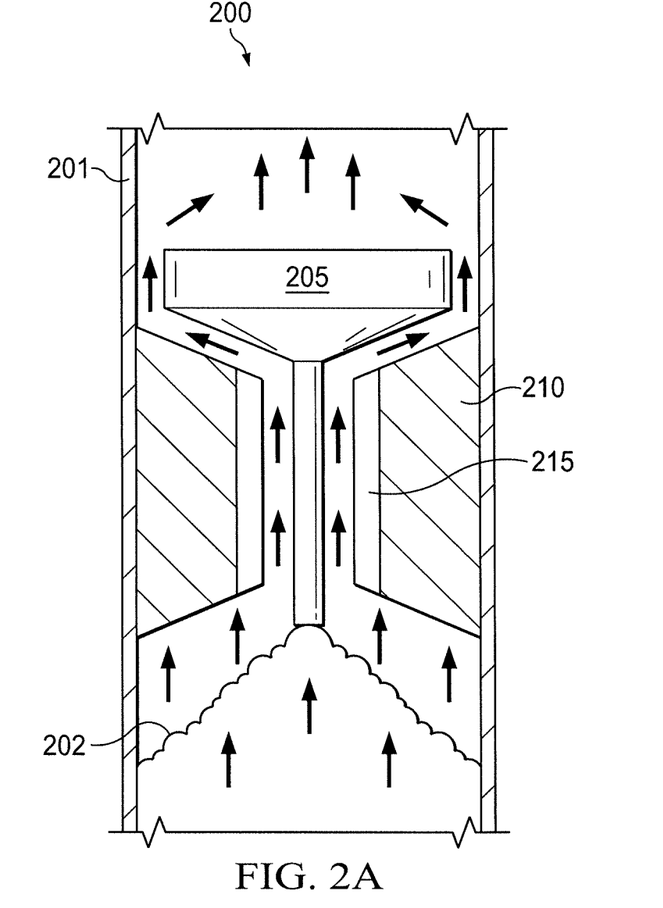
FIGS. 2A and 2B illustrate a first assembly for cementing casing in a wellbore according to embodiments of the present invention.

There are several possible ways to introduce the modified biopolymer into the inner diameter of the casing. FIG. 2A illustrates one possibility. In an exemplary embodiment, an assembly 200 that includes a valve 205, a set of solid extensions 210, and modified biopolymer 215 are provided inside a casing 201. The modified biopolymer 215 is attached onto the walls of the solid extensions 210, which extend radially into the inner diameter of the casing 201. According to several exemplary embodiments, the solid extensions are made of high strength metal that is rust resistant, such as a casing grade metal. The valve 205 is spring loaded, and when fluid is pumped upwards into the casing 201, the spring extension creates room for fluid flow. When mud or spacer fluid is pumped upwards, they do not dissolve the modified biopolymer 215 or react with it. When cement slurry 202, however, comes in contact with the modified biopolymer 215, the modified biopolymer 215 dissolves and reacts with the cement slurry 202 to increase the viscosity of the cement slurry 202, making flow through the casing 201 difficult. The increase in viscosity is accompanied by an increase in pressure of pumping the cement slurry 202. At this point, pumping can be stopped.

Figure 2B:
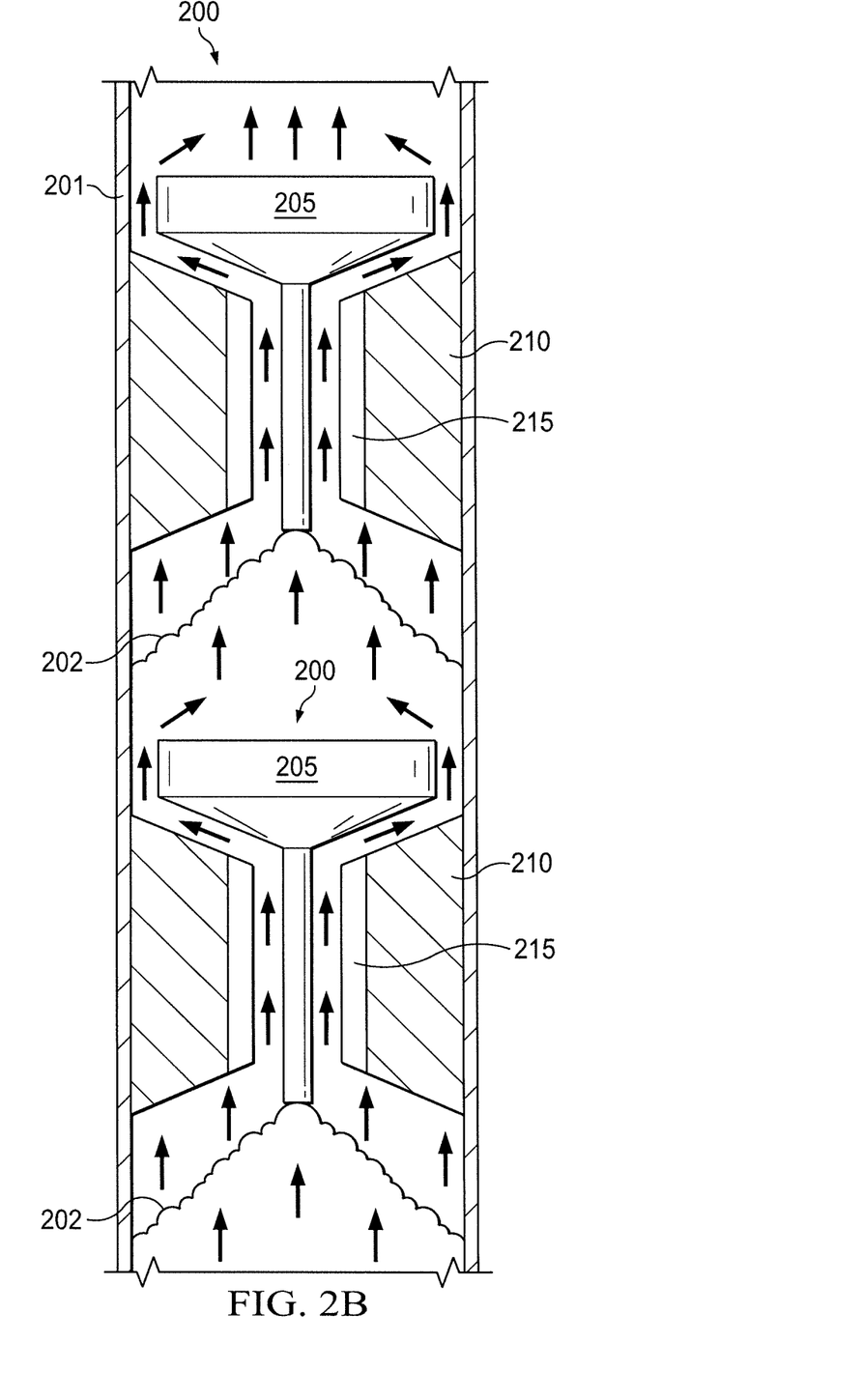

FIG. 2B shows a series of assemblies 200 placed inside the casing 201. This embodiment can be used in deeper wells, to allow the cement slurry 202 to have more contact with the modified biopolymer 215 and to avoid a sudden increase in pumping pressure.

Figure 3A:
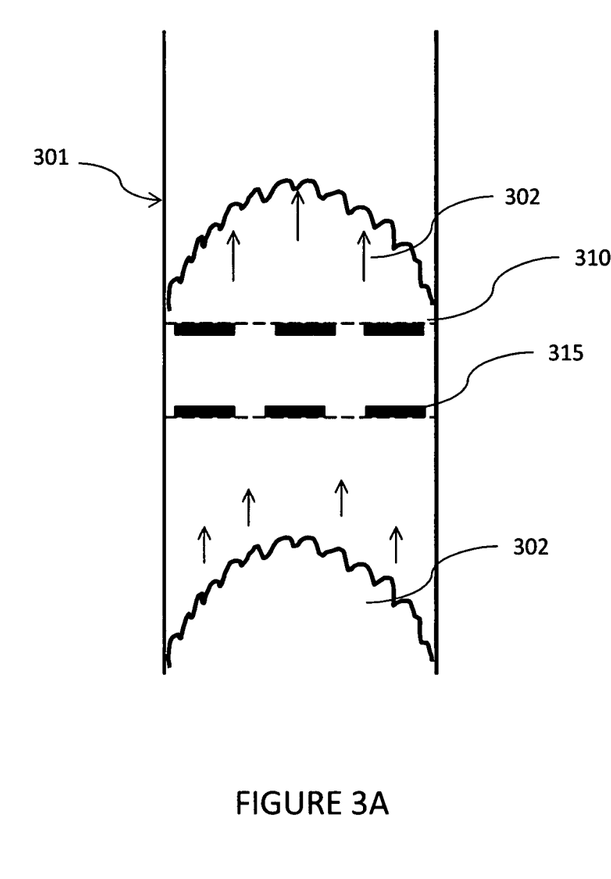
FIGS. 3A and 3B illustrate a second assembly for cementing casing in a wellbore according to embodiments of the present invention.
Figure 3B:
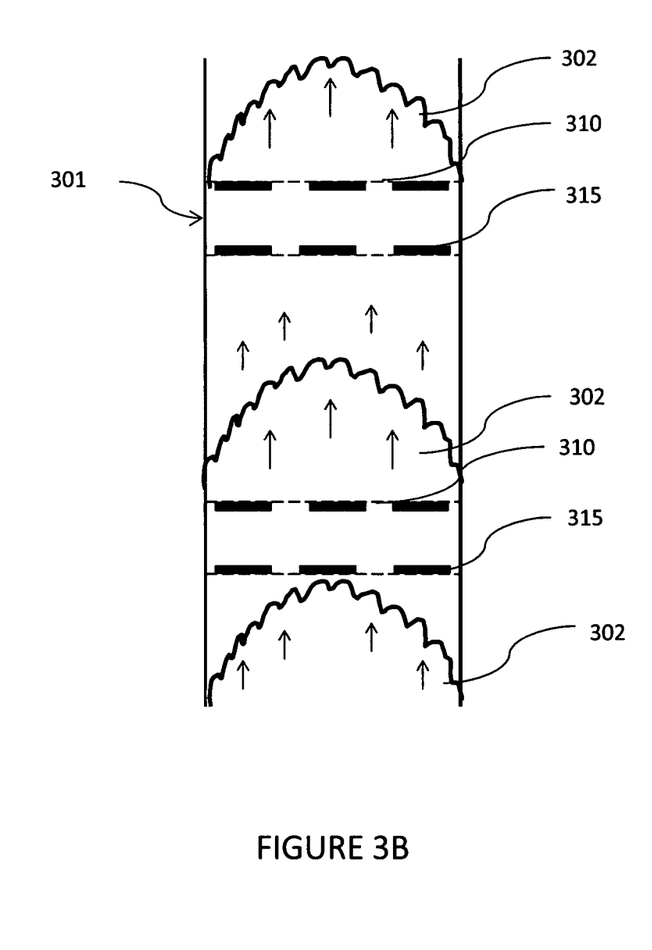

In another exemplary embodiment shown in FIG. 3A, the modified biopolymer 315 is in the form of pellets, and the pellets 315 are included in a set of screens 310 that are placed inside a casing 301. When cement slurry 302 comes in contact with the pellets 315, the pellets 315 dissolve and viscosify the slurry 302, which results in increased pumping pressure. This signal is used to stop the pumping process. As shown in FIG. 3B, the screens 310 and pellets 315 can be used in series inside the casing 301.

According to several exemplary embodiments, before the cement composition is reverse-circulated, fluid is first pumped down the annulus and up the inner diameter of the casing. Fluids suitable for use include any fluid that may be used in cementing and drilling operations. Examples of suitable fluids include, but are not limited to, circulation fluids, drilling fluids, lost circulation fluids, displacement fluids, and spacer fluids.

According to several exemplary embodiments, the cementing composition includes a cementitious material. Any cement suitable for use in subterranean well cementing operations may be included in the wellbore cementing compositions of this disclosure. In an embodiment, the cementitious materials comprise a hydraulic cement that sets and hardens by reaction with water. Examples of hydraulic cements include but are not limited to any type of Portland cement having any density range (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Additives that may be added to the cement include fluid loss control additives, lost circulation materials, defoamers, dispersing agents, set accelerators, salts, formation conditioning agents, weighting agents, set retarders, and the like.

According to several exemplary embodiments, very little pressure must be applied behind the cement composition to pump it down the annulus and up the interior diameter of the casing because gravity pulls the relatively dense cement composition down the annulus. A low-pressure pump, such as a centrifugal pump may be used. As more of the cement composition enters the annulus, the pressure used to pump the cement composition may be reduced.

Thus, an operator at the surface will immediately observe an increase in pump pressure when the modified biopolymer dissolves in the cement composition, and the cement composition increases in viscosity. The operator may use the increase in pump pressure as an indicator to cease pumping cement composition into the annulus. This prevents a significant amount of cement composition from inadvertently entering the casing. Because the inside of the casing remains relatively free of cement, further well operations may be immediately conducted without the need to drill out undesirable cement in the casing.

The following examples are illustrative of the compositions and methods discussed above and are not intended to be limiting.

Example 1

Spacer Fluid Composition

A spacer fluid composition was prepared having the composition shown in Table 1.

TABLE 1

| Materials | Quantity (gm) |
|---|---|
| Tuned ® Spacer III cement spacer | 27.5 |
| Barite | 398.7 |
| D-AIR 3000L ™ defoamer | 0.2 |
| Water | 293.7 |
| Modified Biopolymer | 7.20 |

Tuned® Spacer III cement spacer (commercially available from Halliburton Energy Services, Inc.), barite (commercially available from Halliburton Energy Services, Inc.), water, and D-AIR 3000L™ defoamer (commercially available from Halliburton Energy Services, Inc.) was mixed and conditioned in an atmospheric consistometer for 30 minutes at 160° F. Rheology was measured. Then the modified biopolymer (HEC modified with ethylene carbonate) was added into the cement spacer. This corresponds to the contact of the cement spacer with the modified biopolymer after entering into the casing. The cement spacer was hand mixed and then conditioned again for 30 minutes at 160° F. Then again rheology was measured. The rheology readings are given in Table 2.

TABLE 2

| | Dial Reading at 160° F. | |
|---|---|---|
| RPM | Before Addition of Modified Biopolymer (Pa) | After Addition of Modified Biopolymer (Pa) |
| 3 | 8 | 9 |
| 6 | 10 | 11 |
| 100 | 24 | 28 |
| 200 | 30 | 37 |
| 300 | 38 | 43 |

From Table 2, it is evident that the modified biopolymer does not dissolve in the spacer fluid because of the lack of change in viscosity.

Example 2

Cement Slurry Composition

A cement slurry was prepared having the composition shown in Table 3.

TABLE 3

| Materials | Quantity (gm) |
|---|---|
| Class H Cement | 800 |
| HR ®-6L cement retarder | 6 |
| D-AIR 3000L ™ defoamer | 0.2 |
| Water | 315 |
| Modified Biopolymer | 8 |

Similar to Example 1, the class H cement (commercially available from Lafarge), HR®-6L cement retarder (commercially available from Halliburton Energy Services, Inc.), water, and D-AIR 3000L™ defoamer (commercially available from Halliburton Energy Services, Inc.) was mixed and conditioned in an atmospheric consistometer for 30 minutes at 160° F. Then rheology was measured. The modified biopolymer (HEC modified with ethylene carbonate) was added into the cement slurry. This corresponds to the contact of the cement slurry with the modified biopolymer after entering into the casing. The cement slurry was then hand mixed, and while mixing the slurry gelled up completely and became non-pourable. The rheology readings are given in Table 4 below.

TABLE 4

| | Dial Reading at 160° F. | |
|---|---|---|
| RPM | Before Addition of Modified Biopolymer (Pa) | After Addition of Modified Biopolymer |
| 3 | 4 | Gel |
| 6 | 6 | |
| 100 | 10 | |
| 200 | 19 | |
| 300 | 23 | |

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of cementing casing in a wellbore comprising:
   introducing a modified biopolymer into an inner diameter of the casing, wherein the modified biopolymer comprises a reaction product of a biopolymer and an organic carbonate;
   reverse-circulating a cement composition in the wellbore, wherein the cement composition has a pH greater than 11;
   permitting the modified biopolymer to contact the cement composition; and
   terminating the reverse-circulation upon detection of an increase in pressure in pumping the cement composition.

2. The method of claim 1, wherein the biopolymer is selected from gums, starches, celluloses, derivatized polysaccharides, or combinations thereof.

3. The method of claim 2, wherein the biopolymer comprises hydroxyethyl cellulose and the organic carbonate comprises ethylene carbonate.

4. The method of claim 1, wherein the modified biopolymer is present in the cement composition in an amount of about 0.5 percent to about 10 percent by weight of the cement composition when the reverse-circulation is terminated.

5. The method of claim 1, further comprising pumping mud, spacer fluid, or both in the wellbore.

6. The method of claim 5, wherein the modified biopolymer does not dissolve in the mud or spacer fluid.

7. The method of claim 1, wherein introducing the modified biopolymer into an inner diameter of the casing comprises attaching the modified biopolymer to a set of solid extensions that extend radially into the inner diameter of the casing.

8. The method of claim 7, wherein the casing comprises a plurality of sets of solid extensions that are located a vertical distance from each other.

9. The method of claim 1, wherein introducing the modified biopolymer into an inner diameter of the casing comprises placing a set of screens containing the modified biopolymer inside the casing.

10. The method of claim 9, wherein the modified biopolymer is in the form of pellets.

11. The method of claim 9, wherein the casing comprises a plurality of sets of screens that are located a vertical distance from each other.

12. The method of claim 1, wherein a centrifugal pump is used to reverse-circulate the cement composition in the wellbore.

13. A method of cementing casing in a wellbore comprising:
   introducing a modified biopolymer into an inner diameter of the casing, wherein the modified biopolymer comprises a reaction product of a biopolymer and an organic carbonate;
   pumping a cement slurry down an annulus defined between the casing and the wellbore and up the inner diameter of the casing, wherein the cement slurry has a pH greater than 11;
   permitting the modified biopolymer to dissolve in the cement slurry;
   monitoring a pressure in pumping the cement slurry; and
   stopping the pumping of the cement slurry upon detection of an increase in pressure in pumping the cement slurry.

14. The method of claim 13, wherein the biopolymer comprises hydroxyethyl cellulose and the organic carbonate comprises ethylene carbonate.

15. The method of claim 13, further comprising pumping mud, spacer fluid, or both in the wellbore.

16. The method of claim 15, wherein the modified biopolymer does not dissolve in the mud or spacer fluid.

17. The method of claim 13, wherein introducing the modified biopolymer into an inner diameter of the casing comprises attaching the modified biopolymer to a set of solid extensions that extend radially into the inner diameter of the casing.

18. The method of claim 13, wherein introducing the modified biopolymer into an inner diameter of the casing comprises placing a set of screens containing the modified biopolymer inside the casing.

19. A system for cementing casing in a wellbore, comprising:
   a pair of solid extensions that extend radially into an inner diameter of the casing, wherein:
      a modified biopolymer is attached to the solid extensions,
      the modified biopolymer comprises a reaction product of a biopolymer and an organic carbonate, and
      the modified biopolymer dissolves in cement compositions and causes an increase in pressure in pumping the cement compositions; and
   a valve positioned in between the pair of solid extensions.

20. The system of claim 19, wherein the valve is spring-loaded.

* * * * *